US012791455B2

(12) United States Patent
Lee et al.

(10) Patent No.: US 12,791,455 B2
(45) Date of Patent: Nov. 10, 2026

(54) ACCELERATED FATIGUE EVALUATION DEVICE FOR WELDED PORTION OF BATTERY MODULE FRAME FOR VEHICLE

(71) Applicant: LG ENERGY SOLUTION, LTD., Seoul (KR)

(72) Inventors: Suhang Lee, Daejeon (KR); Youngil Kim, Daejeon (KR); Yonseok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 230 days.

(21) Appl. No.: 18/856,499

(22) PCT Filed: Dec. 15, 2023

(86) PCT No.: PCT/KR2023/020761

§ 371 (c)(1),
(2) Date: Oct. 11, 2024

(87) PCT Pub. No.: WO2024/136336

PCT Pub. Date: Jun. 27, 2024

(65) Prior Publication Data

US 2025/0264391 A1 Aug. 21, 2025

(30) Foreign Application Priority Data

Dec. 21, 2022 (KR) ........................ 10-2022-0180259

(51) Int. Cl.
*G01N 3/36* (2006.01)
*H01M 10/42* (2006.01)

(52) U.S. Cl.
CPC .......... *G01N 3/36* (2013.01); *H01M 10/4285* (2013.01); *G01N 2203/0073* (2013.01)

(58) Field of Classification Search
CPC .... G01N 3/36; G01N 2203/0073; G01N 3/04; G01N 3/12; G01N 2203/0005;
(Continued)

(56) References Cited

U.S. PATENT DOCUMENTS

2014/0223729 A1* 8/2014 Chang ................. H01M 50/169
29/623.2
2017/0018820 A1* 1/2017 Fukuda ................ G01R 31/382
(Continued)

FOREIGN PATENT DOCUMENTS

JP 2006-202560 A 8/2006
JP 2015-133180 A 7/2015
(Continued)

OTHER PUBLICATIONS

International Search Report (PCT/ISA/210) issued in PCT/KR2023/020761, dated Mar. 25, 2024.
(Continued)

*Primary Examiner* — David J Bolduc
(74) *Attorney, Agent, or Firm* — Birch, Stewart, Kolasch & Birch, LLP

(57) ABSTRACT

An acceleration fatigue evaluation device of a welding part of a module frame includes a module frame for testing having a top plate and an end frame welded to the top and two sides of a U-frame, respectively and an unwelded low surface of the U-frame opened; a center jig connected to support a front and a rear of the module frame for testing; a guide block jig for downwardly supporting an end frame of the module frame for testing; a piston for entering the module frame for testing and applying a repeated load to an inner surface of the top plate; at least one battery cell interposed between the piston and the inner surface of the top plate; and a displacement sensor for measuring a deformation at a center of an outer surface of the top plate.

10 Claims, 6 Drawing Sheets

(58) Field of Classification Search

CPC ... G01N 2203/0048; G01N 2203/0296; G01N 2203/0682; H01M 10/4285; H01M 2220/20; H01M 50/211; G01B 21/32; G01M 5/0075; G01M 99/007; Y02E 60/10

See application file for complete search history.

(56) References Cited

U.S. PATENT DOCUMENTS

| | | | | |
|---|---|---|---|---|
| 2018/0226698 | A1* | 8/2018 | Lin | H01M 10/0525 |
| 2021/0041334 | A1* | 2/2021 | Adler | G01N 3/32 |
| 2023/0129302 | A1* | 4/2023 | Lee | G01N 3/12<br>73/862.627 |
| 2023/0375449 | A1* | 11/2023 | Kim | G01M 5/0033 |
| 2023/0420779 | A1* | 12/2023 | Kim | H01M 50/211 |
| 2024/0047806 | A1* | 2/2024 | Kwon | H01M 50/264 |

FOREIGN PATENT DOCUMENTS

| | | | |
|---|---|---|---|
| JP | 2023-519374 | A | 5/2023 |
| JP | 2023-534471 | A | 8/2023 |
| KR | 10-2091431 | B1 | 3/2020 |
| KR | 10-2146075 | B1 | 8/2020 |
| KR | 10-2021-0055363 | A | 5/2021 |
| KR | 10-2021-0073898 | A | 6/2021 |
| KR | 10-2308856 | B1 | 10/2021 |
| KR | 10-2022-0020126 | A | 2/2022 |
| KR | 10-2022-0037635 | A | 3/2022 |
| KR | 10-2022-0063611 | A | 5/2022 |
| KR | 10-2453502 | B1 | 10/2022 |
| KR | 10-2454249 | B | 10/2022 |
| WO | WO 2022/060033 | A1 | 3/2022 |
| WO | WO 2022/103132 | A1 | 5/2022 |

OTHER PUBLICATIONS

Extended European Search Report for European Application No. 23907622.7, dated Jul. 11, 2025.

* cited by examiner

【FIG. 1】
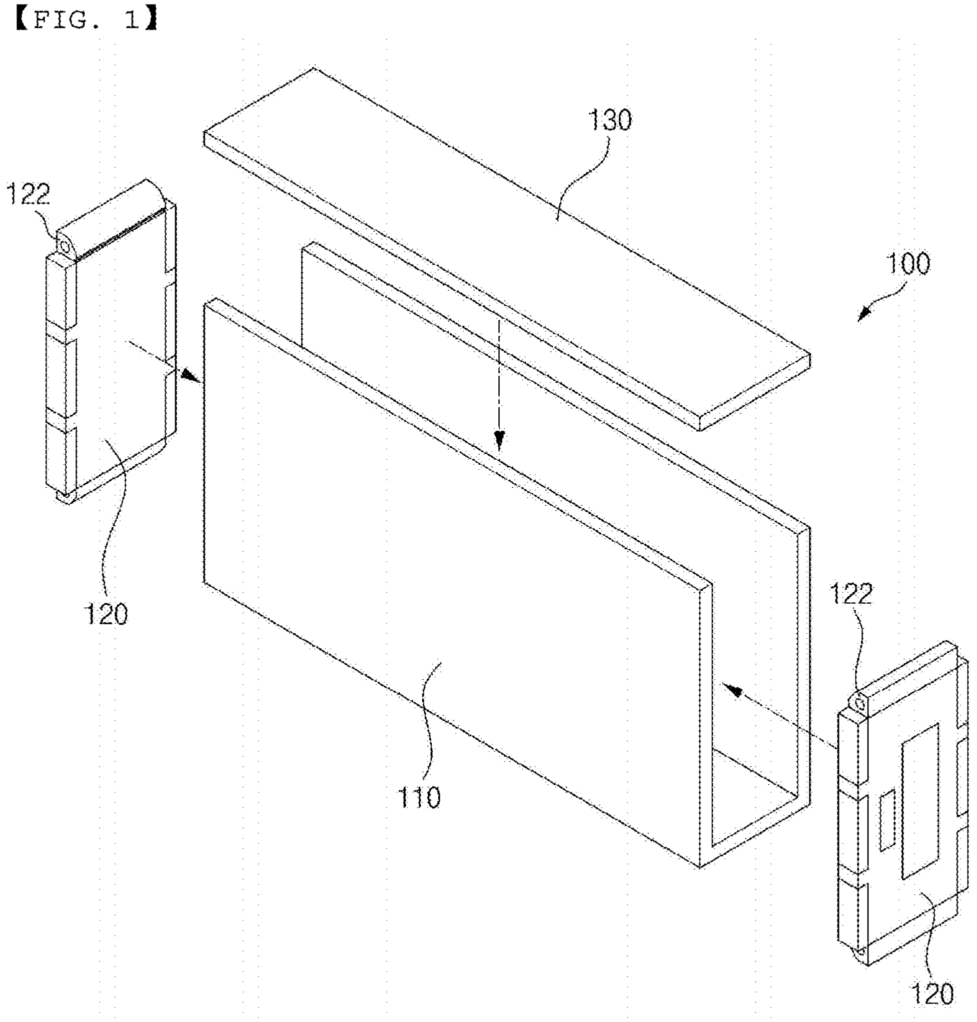

【FIG. 2】
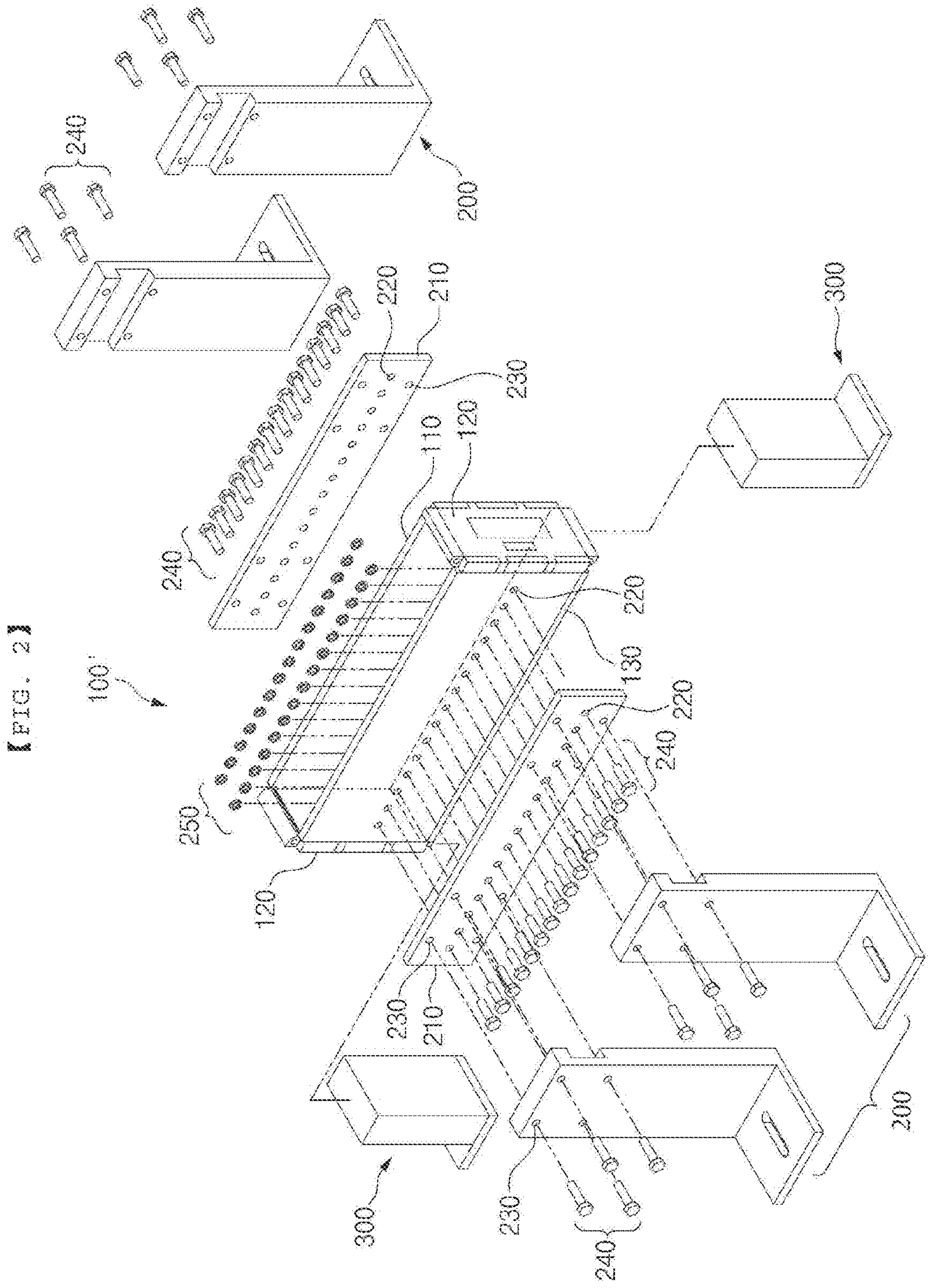

【FIG. 3】
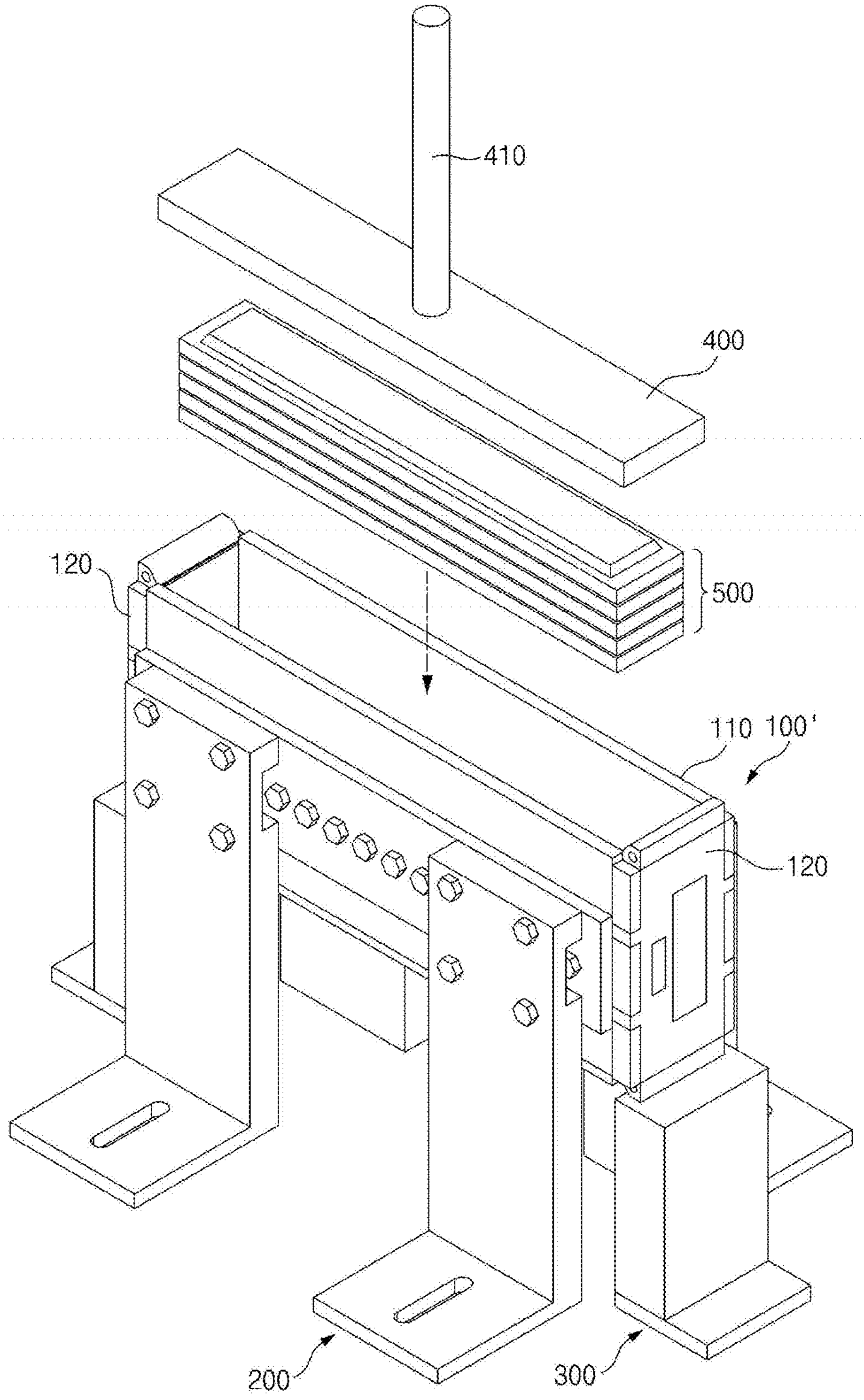

【FIG. 4】
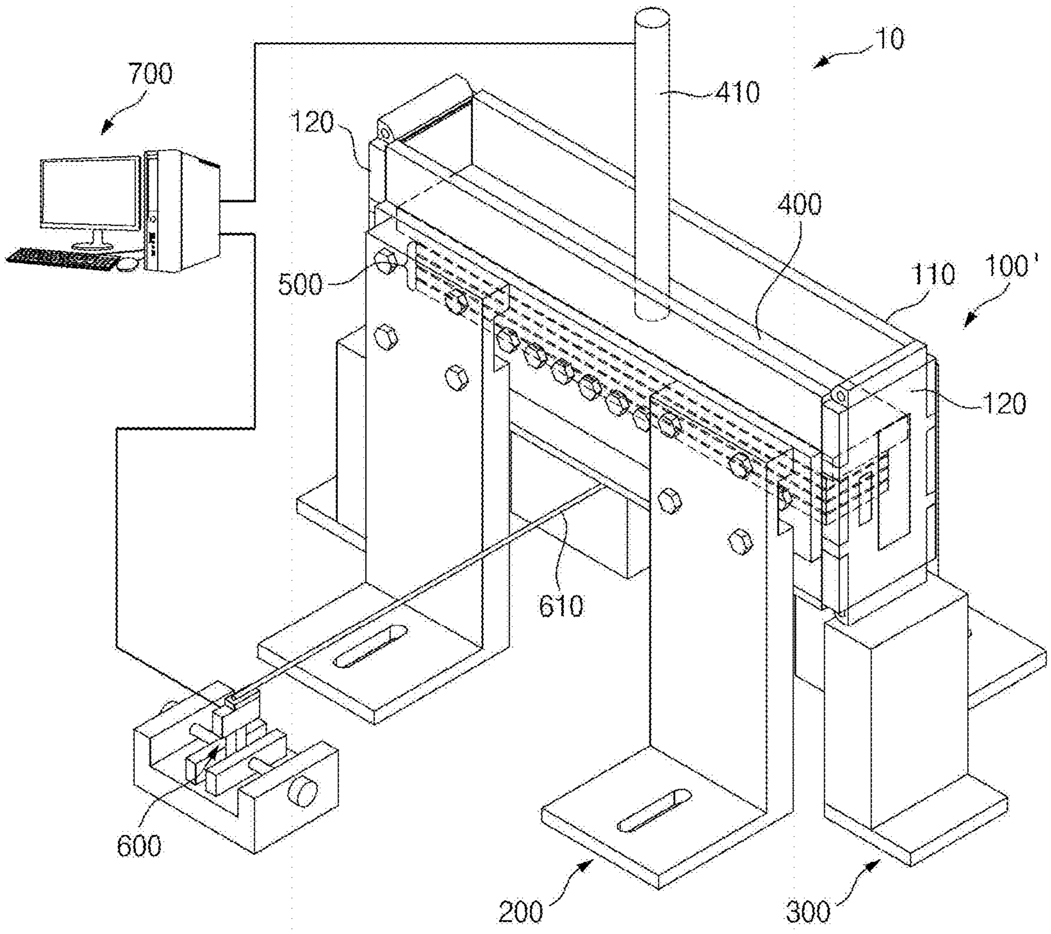

【FIG. 5】
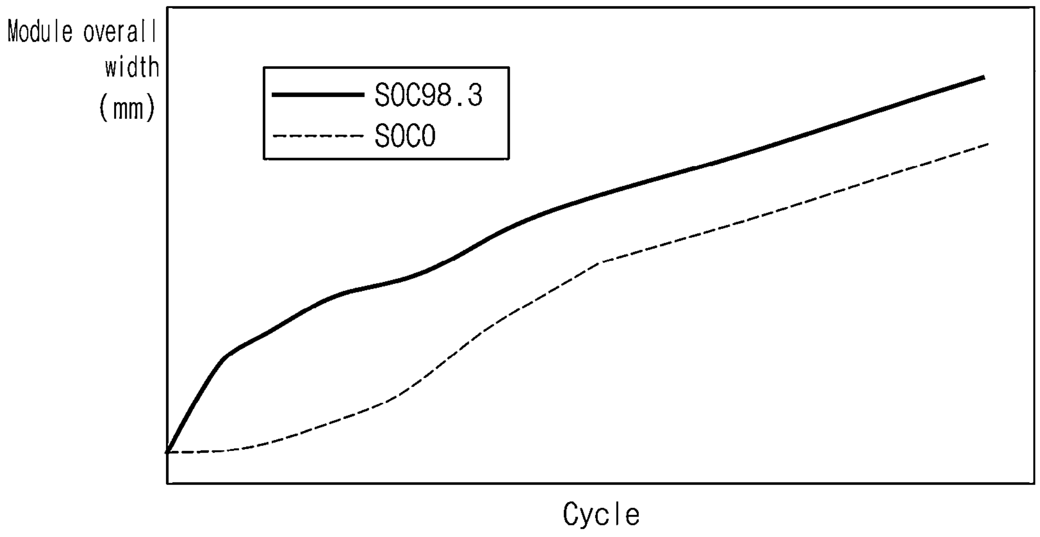
【FIG. 6】
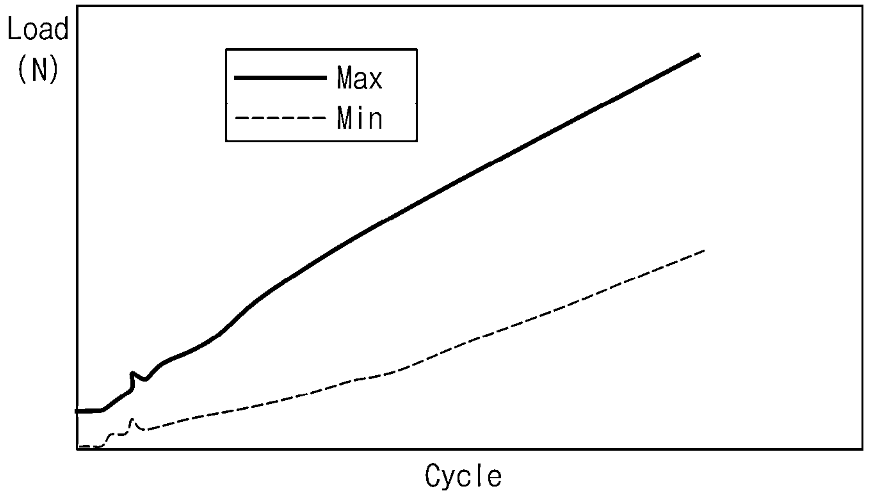

【FIG. 7】
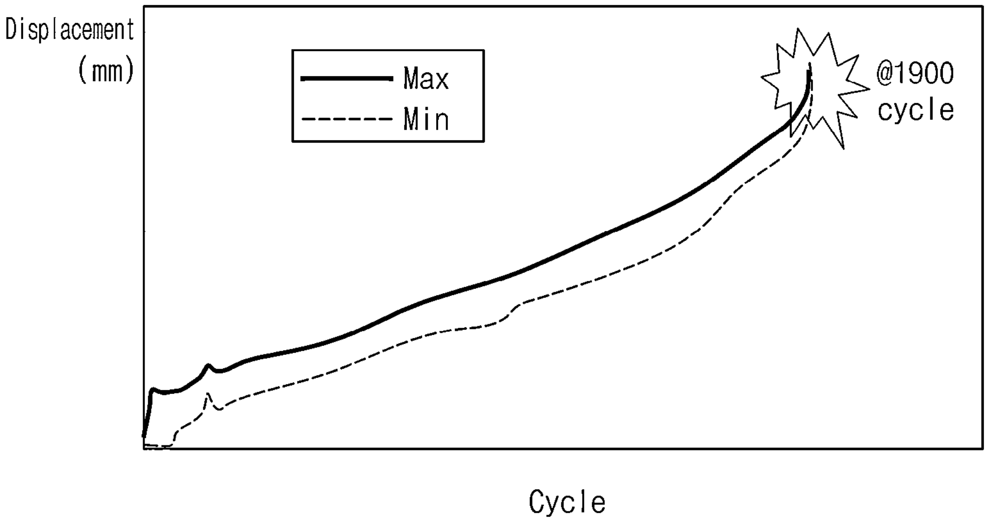

ACCELERATED FATIGUE EVALUATION DEVICE FOR WELDED PORTION OF BATTERY MODULE FRAME FOR VEHICLE

TECHNICAL FIELD

The present invention relates to an acceleration fatigue evaluation device of welding part of a battery module frame for a vehicle, in which reliable results on acceleration fatigue failure of the welding part can be obtained by applying a repeated load simulating the swelling behavior of the battery cell to the welding part of the battery module frame for a vehicle.

This application claims the benefit of priority based on Korean Patent Application No. 10-2022-0180259, filed on Dec. 21, 2022, and the entire contents of the Korean patent application are incorporated herein by reference.

BACKGROUND ART

Unlike primary batteries, secondary batteries are rechargeable and have been extensively researched and developed recently due to potential for miniaturization and high-capacity applications. With the increasing technological advancements and demand for mobile devices, as well as the growing prominence of electric vehicles and energy storage systems in response to environmental concerns, the demand for secondary batteries as an energy source are rapidly and significantly increasing.

When a large capacity of a secondary battery is required, such as in an electric vehicle, a plurality of battery cells is connected in series and/or parallel to form an aggregated structure to fulfill the required capacity requirement. A battery module frame is provided as a case for storing a plurality of secondary batteries, and a plurality of battery cells are stacked in a receiving space formed in a cuboidal shape inside the module frame.

It is common for a modular frame to be constructed by welding several plates together, and an example of such a module frame is shown in FIG. 1. The module frame is formed by having end frames welded to the left and right sides of an U-frame bent in the form of an U-shape, and a top plate welded to the other side of the U-frame forming the top surface of the module frame.

A plurality of battery cells stored in the battery module frame are repeatedly charged and discharged, and the electrode assembly in the battery cells is subjected to a swelling phenomenon. As the electrode assembly expands and contracts by repeatedly charging and discharging, the swelling phenomenon causes localized expansion of the battery cells, and the battery module frame is subjected to continuous pressure due to the expansion of the battery cells.

Since the module frame should maintain its durability over the lifespan of the battery module, it is essential to evaluate the structural stability of the module frame at the initial stage of the battery module design. However, it takes a long time to evaluate the structural stability of the battery module frame by repeatedly charging and discharging actual battery cells, so simulating experiments are conducted to shorten the testing time.

In the module frame of FIG. 1, the welding part area of the top plate is the most concerning area for fatigue failure. When the stacked battery cells expand, the force due to their deformation applies in the upward and downward directions, and since the bottom surface of the module frame is an integral bending structure, the welding part of the top plate is relatively structurally weak. Therefore, it is expected that a crack may occur in the welding part of the top plate by fatigue failure due to repeated loading and spread along the welding part, causing the top plate to be damaged, and thus it is evaluated.

Conventionally, tests have been conducted by applying a constant load to the top plate with a piston hydraulic pressure repeatedly. However, in order to simulate the characteristics of the battery cell, which expands the most in the center, the piston has a convex shape with a gently protruding central area, and it was found that the size and shape of the convex shape caused significant differences in the test results.

In addition, the hydraulic pressure applied to the piston was based on the loading conditions at the end of life (EOL), which was too harsh from the beginning, making it difficult to obtain reliable results on the actual lifespan of the module frame.

DISCLOSURE

Technical Problem

The present invention is directed to providing an acceleration fatigue evaluation device, which can obtain reliable results on acceleration fatigue failure of welding part by applying repeated loads simulating the swelling behavior of a battery cell accommodated in a battery module frame under conditions similar to actual conditions.

However, the technical problem to be solved by the present invention is not limited to the above-described problem, and other problems not mentioned can be clearly understood by a person skilled in the art from the description of the invention described below.

Technical Solution

The present invention relates to an acceleration fatigue evaluation device of a welding part of a module frame, comprising, in one example, a module frame for testing having: a U-frame, the U-frame having an open, unwelded lower surface; a top plate; and a pair of end frames welded to the top plate and opposite sides of the U-frame; a center jig connected to the module frame for testing to support a front of the module frame for testing and a rear of the module frame for testing; a guide block jig supporting the end frame of the module frame for testing from below; a piston configured to enter the module frame for testing, the piston being configured to apply a repeated load to an inner surface of the top plate; at least one battery cell interposed between the piston and the inner surface of the top plate; and a displacement sensor configured to measure a deformation at a center of an outer surface of the top plate.

In one embodiment of the present invention, the battery cell may be of a same specification as the battery cell mounted in the module frame.

For example, the battery cell may be a pouch cell, wherein the pouch cell is preferably interposed between the piston and the inner surface of the top plate in a completely discharged state.

In addition, the guide block jig may preferably have downwardly supported edges thereof to avoid encroaching on welding parts of the end frame.

Meanwhile, the repeated load applied by the piston to the top plate via the battery cell may be applied in a profile simulating displacement of swelling expansion and contraction of the battery cell as the battery cell progresses through a charge and discharge cycle.

For example, the profile is a load-cycle profile that converts the displacement of the swelling expansion and contraction of the battery cell over the progression of the charge and discharge cycle into a load.

The load-cycle profile may have a pattern wherein a load at charge and a load at discharge increase with the progression of the charge and discharge cycle.

Further, a difference value between the load at charge and the load at discharge increases with the progression of the charge and discharge cycle.

Further, the acceleration fatigue evaluation device of a welding part of a module frame may include a controller, and, in a cycle in which the amount of deformation of the top plate measured by the displacement sensor deviates from a linear increasing pattern and suddenly increases sharply, the controller is configured to: determine that the welding part of the top plate has been destroyed; and stop the application of the repeated load.

Advantageous Effects

The acceleration fatigue evaluation device of a welding part of a module frame of the present invention having the configuration as described above, simulates constraint condition of a module frame mounted on a vehicle by a center jig and a guide block jig, meanwhile, by applying a repeated load of a piston to an inner surface of a top plate, a pressurized condition of a swelling behavior of a battery cell inside a module frame can be simulated, thereby enabling an evaluation of acceleration fatigue of a welding part of a module frame to be reliably performed.

In addition, the repeated load of the piston acts on the welding part of the top plate through the battery cell interposed between the inner surfaces of the top plate, which makes it possible to more closely approach the conditions under which the battery cell applies force to the top plate in actual conditions and prevents deviations in the evaluation results caused by the form of the piston.

In addition, by analyzing the swelling behavior of the actual battery cell under charge and discharge cycles and applying it to the cycles of repeated loads applied to the piston, it is possible to derive more realistic and reliable test results, without the overestimation caused by applying end-of-life loading conditions from the beginning of the test.

However, the technical effects that can be obtained through the present invention is not limited to the above-described effects, and other effects not mentioned can be clearly understood by a person skilled in the art from the description of the invention described below.

BRIEF DESCRIPTION OF THE DRAWINGS

Because the following drawings attached to the present specification illustrate exemplary embodiments of the present invention and serve to facilitate understanding of the technical idea of the present invention together with the detailed description of the invention described below, the present invention should not be limitedly interpreted on the basis of the drawings.

FIG. 1 is a drawing illustrating an example of a battery module frame for a vehicle.

FIG. 2 is a drawing illustrating a structure for installing a center jig and a guide block jig on a module frame for testing.

FIG. 3 is a drawing illustrating a center jig and a guide block jig installed on a module frame for testing.

FIG. 4 is a drawing illustrating an acceleration fatigue evaluation device of a welding part of a module frame including the module frame for testing of FIG. 2.

FIG. 5 is a drawing illustrating an example of the swelling behavior of a battery cell subjected to a charge-discharge cycle.

FIG. 6 is a drawing illustrating an example conversion of the swelling behavior of FIG. 5 into a load-cycle profile.

FIG. 7 is a drawing illustrating an exemplary result of a fatigue test using an acceleration fatigue evaluation device of welding part of the module frame of FIG. 4.

BEST MODE

The present invention may have various modifications and various embodiments, and thus specific embodiments thereof will be described in detail below.

However, it should be understood that the present invention is not limited to the specific embodiments, and includes all modifications, equivalents, or alternatives within the spirit and technical scope of the present invention.

The terms "comprise," "include," and "have" used herein designate the presence of characteristics, numbers, steps, actions, components, or members described in the specification or a combination thereof, and it should be understood that the possibility of the presence or addition of one or more other characteristics, numbers, steps, actions, components, members, or a combination thereof is not excluded in advance.

In addition, in the present invention, when a part of a layer, film, region, plate, or the like is disposed "on" another part, this includes not only a case in which one part is disposed "directly on" another part, but a case in which still another part is interposed therebetween. In contrast, when a part of a layer, film, region, plate, or the like is disposed "under" another part, this includes not only a case in which one part is disposed "directly under" another part, but a case in which still another part is interposed therebetween. In addition, in the present application, "on" may include not only a case of being disposed on an upper portion but also a case of being disposed on a lower portion.

The present invention relates to an acceleration fatigue evaluation device of a welding part of a module frame, comprising, in one example, a module frame for testing having a module frame with a top plate and an end frame welded to the top and two sides of a U-frame, respectively and an unwelded low surface of the U-frame opened; and a center jig connected to support a front and a rear of said module frame for testing; and a guide block jig for downwardly supporting an end frame of said module frame for testing; and a piston for entering said module frame for testing and applying a repeated load against an inner surface of the top plate; and at least one battery cell interposed between the piston and the inner surface of the top plate; and a displacement sensor for measuring a deformation at a center of an outer surface of the top plate.

The acceleration fatigue evaluation device of welding part of a battery module frame of the present invention having the configuration as described above, simulates a constraint condition of a module frame mounted on a vehicle by a center jig and a guide block jig, meanwhile, by applying a repeated load to an inner surface of a top plate by a piston, a pressurization condition of a swelling behavior of a battery cell inside the module frame can be simulated, thereby an evaluation of acceleration fatigue of welding part of the module frame can be reliably performed.

In addition, the repeated load of the piston acts on the welding part of the top plate through the battery cell interposed between the inner surfaces of the top plate, which more closely approximates the conditions under which the battery cell applies force to the top plate in actual conditions and prevents the form of the piston from causing deviations in the evaluation results.

MODE FOR INVENTION

Hereinafter, specific embodiments of a secondary battery of the present invention will be described in detail with reference to the accompanying drawings. For reference, the directions of front, back, up, down, left, and right used in the following description to designate relative positions are for the purpose of understanding the invention and refer to the directions shown in the drawings unless otherwise specified.

First Embodiment

The acceleration fatigue evaluation device of welding part of module frame 100 (hereinafter referred to as "acceleration fatigue evaluation device of welding part" for short) according to the present invention includes a module frame for testing 100', a center jig 200 and a guide block jig 300 for supporting it, a piston 400 operated hydraulically, a battery cell 500, and a displacement sensor 600.

The module frame for testing 100', which is provided for fatigue failure of the welding part, is made by processing the module frame 100 of FIG. 1. The module frame 100 is completed by welding an end frame 120 to the left and right sides of the U-frame 110 bent in the form of an U-shape, and a top plate 130 to the other side forming the upper surface of the module frame 100. Here, it is the area of the welding part of the top plate 130 that is of most concern for fatigue failure in the module frame 100, so the module frame 100' is prepared for testing by cutting and leaving open the low side of the unwelded U-frame 110.

The module frame for testing 100' is installed on a test table (not shown) by a center jig 200 and a guide block jig 300. In particular, the module frame for testing 100' is preferably installed as a restraining structure simulating a state in which the actual module frame 100 is mounted on a vehicle.

Referring to the module frame 100 of FIG. 1, the end frames 120 on both sides are provided with mounting brackets 122. Therefore, it is possible to install the module frame for testing upright by utilizing the mounting brackets 122 of the end frames 120, but in an actual vehicle, the module frame 100 is installed by lying down so that the front and rear faces of the module frame 100 are facing in a straight direction, so that it is not in accordance with the actual situation to install it upright by utilizing the mounting brackets 122, and if an accelerated fatigue evaluation is performed in which the time taken for one cycle is significantly reduced in order to shorten the test time, there is a high possibility that the test may fail due to the deformation of the mounting brackets 122 and the load of the piston 400 being applied incorrectly.

Considering these circumstances, the present invention, as illustrated in FIG. 2, uses a center jig 200 to support the front and rear of the module frame for testing 100', meanwhile, a guide block jig 300 is configured to downwardly support the end frame 120 of the module frame for testing 100'.

Here, if the center jig 200, which serves as the four legs supporting the module frame for testing, is directly tied to the front and rear surfaces of the module frame for testing, the force applied to the module frame for testing (the reaction force against the piston load) may be concentrated in a narrow area, causing the U-frame 110 to deform, thereby affecting the rigidity of the welding part of the top plate 130. This is not intended purely for the purpose of simulating fatigue failure of the welding part due to the swelling behavior of the battery cell 500 as in a real-world situation.

In consideration of this, the center jig 200 is connected to the front and rear surfaces of the module frame for testing 100' by means of a reinforced plate 210. The reinforced plate 210 comprises an area corresponding to approximately 60% or more of the surface area of the front and rear surfaces of the module frame for testing 100' and is mounted to the front and rear surfaces of the module frame for testing 100' by a plurality of evenly spaced bolts 240 and nuts 250, respectively. As shown in FIG. 2, the reinforced plate 210 and the U-frame 110 are mutually rigidly coupled by the bolts 240 and nuts 250 to a plurality of through holes 220 formed in the front and rear surfaces of the U-frame 110, respectively.

Further, the center jig 200 and the reinforced plate 210 are formed with mutually corresponding fastening holes 230, and a support structure of the center jig 200 is made by fastening the center jig 200 and the reinforced plate 210 with bolts 240 through the fastening holes 230. In this way, the center jig 200 supports the front and rear surfaces of the U-frame 110 by means of the reinforced plate 210, so that the top plate 130 is fully subjected to the repeated load of the piston 400.

In addition, the end frame 120 of the module frame for testing 100' is supported downwardly by a guide block jig 300 to properly distribute and burden the forces applied to the center jig 200. Here, as shown in FIG. 3, the guide block jig 300 is downwardly supported at its corners so as not to encroach on the welding parts of the end frame 120. On the top surface of the module frame for testing 100', the welding parts of the end frame 120 and the welding parts of the top plate 130 are attached to each other, so that if the guide block jig 300 encroaches on the welding part of the end frame 120, the guide block jig 300 will consequently support a portion of the welding part of the top plate 130. This will cause the guide block jig 300 to contribute to fatigue failure of the welding part of the top plate 130 due to the swelling behavior of the battery cell 500, and to avoid this, the guide block jig 300 is positioned to downwardly support a portion of the edge outside the welding part of the end frame 120.

Here, the criteria of the upper surface and the lower surface are based on the module frame 100 of FIG. 1, and accordingly, the module frame for testing 100' is installed with the upper and lower surfaces reversed, as shown in FIGS. 2 and 3, but the side of the top plate 130 on which the repeated load of the piston 400 is applied is referred to as the upper surface.

Further, the piston 400, connected to the hydraulic cylinder 410, enters through the lower surface of the open module frame for testing 100' and applies a repeated load to the inner surface of the top plate 130. Here, in the acceleration fatigue evaluation device of welding part 10 of the present invention, at least one battery cell 500 is interposed between the piston 400 and the inner surface of the top plate 130.

By causing the repeated load of the piston 400 to act on the welding part of the top plate 130 through the battery cell 500 interposed between the inner surfaces of the top plate 130, it is possible to more closely approach the conditions under which a battery cell 500 expanded by the swelling phenomenon would apply force to the top plate 130 in practice. Furthermore, the involvement of the battery cells 500 in the load transfer path of the piston 400 prevents the deviation of the evaluation results from being caused by the shape of the piston 400.

In this respect, in one embodiment of the present invention, it may be desirable that the battery cells 500 that enter the module frame for testing 100' have the same specifications as the battery cells 500 that are actually mounted in the module frame 100. This is because the accelerated fatigue of the welding part can be evaluated under conditions that more closely approximate the actual situation, and because the size of the actual battery cell 500 accurately loads the module frame for testing 100'. The number of battery cells 500 used for testing may be selected appropriately and may be as few as slightly less than half the height of the module frame for testing 100'.

For example, the battery cell 500 used in the accelerated fatigue test may be a pouch cell, wherein the pouch cell is cased by a pouch made of a flexible laminated sheet, so that the repeated load of the piston 400 acts evenly on the welding parts of the top plate 130. Preferably, the pouch cell is interposed between the piston 400 and the inner surface of the top plate 130 in a fully discharged state. This is because it is necessary to consider the risk of fire in the event of electrolyte leakage from the pouch cell due to the load application of the piston 400.

Further, the acceleration fatigue evaluation device of welding part 10 of the present invention includes a displacement sensor 600 that measures the deformation at the center of the outer surface of the top plate 130. A sensing part 610 of the displacement sensor 600 is in contact with the center of the outer surface of the top plate 130, and the displacement of the sensing part 610 measures the amount of deformation of the top plate 130. Generally, if the displacement sensor 600 has a precision on a level of about 1/100 mm of a millimeter, the amount of deformation of the top plate 130 can be determined with sufficient accuracy.

The control part 700 controls the hydraulic cylinder 410 so that the repeated load of the piston 400 is applied according to a predetermined strategy, meanwhile, and receives the measurement signal of the displacement sensor 600 to observe and store the amount of deformation of the top plate 130 in real time. The control part 700 may be implemented as a conventional computing device.

Second Embodiment

In the first embodiment of the present invention, the hardware configuration of the acceleration fatigue evaluation device of welding part 10 was described in detail, and hereinafter it will be described how it is preferable to set the repeated load applied to the piston 400.

The purpose of the present invention is to obtain reliable results on accelerated fatigue failure of welding parts by applying repeated loads simulating the swelling behavior of the battery cells 500 accommodated in the battery module frame 100 under conditions similar to those in practice. Accordingly, the repeated load applied by the piston 400 to the welding part of the top plate 130 preferably simulates the deformation of the battery cell 500 accompanying the swelling behavior of the battery cell 500 in practice.

FIG. 5 is a drawing illustrating an example of the swelling behavior of the battery cell 500 over a charge-discharge cycle. In the graph of FIG. 5, the top solid line shows the amount of change (mm) in the overall width of the battery cell module when the battery cell 500 is fully charged (SOC 98.3%) as the charge-discharge cycle progresses, and the bottom dashed line shows the amount of change (mm) in the overall width of the battery cell module when the battery cell 500 is fully discharged (SOC 0%) as the charge-discharge cycle progresses.

A battery cell module refers to a plurality of battery cells 500 accommodated within a single battery module frame 100, and the swelling behavior of an individual battery cell 500 can be understood as the amount of change in its overall width when expanded as a module unit. In general, the amount of change in the overall width of a module of battery cells 500 increases as the charge/discharge cycle progresses.

Therefore, the present invention configures the piston 400 so that the repeated load that it applies to the top plate 130 via the battery cell 500 is applied in a profile that simulates the displacement of the swelling expansion and contraction over the course of the charge and discharge cycles of the battery cell 500, as shown in FIG. 5, so that more reliable accelerated fatigue testing can be achieved. In other words, the repeated load on the piston 400 will correspond to the change amount in the overall width of the battery cell module of FIG. 5, and will simulate the charge and discharge cycles as closely as possible by repeatedly increasing and decreasing the load by moving between two change curves as the cycles accumulate.

However, since it is easier to control the load than to control the amount of displacement in an actual fatigue failure test, the repeated load of the piston 400 may be applied as a load-cycle profile that converts the displacement of the swelling expansion and contraction of the battery cell 500 over the course of a charge-discharge cycle into a load. An example of such a load-cycle profile for repeated loading of the piston 400 is shown in FIG. 6.

Referring to FIG. 6, the load-cycle profile has a shape in which the charge and discharge loads each increase as the charge discharge cycle progresses. The load-cycle profile also shows that the difference between the charging load and the discharging load may also increase with the progression of the cycle. The time taken for a cycle can be selected appropriately by considering the trade-off between shortening the overall test time as an accelerated fatigue test, and the risk that repeating the cycle at shorter intervals may lead to erroneous test results due to a greater deviation from the actual swelling behavior. For example, repeated loads can be applied with a time of 20 seconds per cycle (0.05 Hz).

FIG. 7 is a graphical drawing illustrating the amount of deformation (mm) of the top plate 130 measured by the displacement sensor 600 during the accelerated fatigue evaluation process described above. The amount of deformation when the charge and discharge loads are applied over the course of the cycle shows a roughly linear increase, but after a certain number of cycles, the linear increase ceases and the amount of deformation increases instantaneously and sharply, like a staircase. At this point, it can be determined that the welding part of the top plate 130 is destroyed and the test can be stopped, and the fatigue failure life of the module frame 100 can be predicted by converting the number of cycles in which the welding part is destroyed as a result of the accelerated fatigue test to the time of the actual charge-discharge cycle.

In this way, the acceleration fatigue evaluation device of welding part 10 according to the present invention analyzes the swelling behavior of the actual battery cell 500 according to the charge-discharge cycle and applies it to the cycle of repeated load applied to the piston 400, so that it is possible to derive more realistic and reliable test results, without overestimation due to applying the load condition of the end of lifespan from the beginning of the test.

As above, the present invention has been described in more detail through the drawings and embodiments. However, since the configuration described in the drawings or embodiments described herein is merely one embodiment of the present invention and do not represent the overall technical spirit of the invention, it should be understood that the invention covers various equivalents, modifications, and substitutions at the time of filing of this application.

DESCRIPTION OF REFERENCE NUMERALS

10: acceleration fatigue evaluation device of welding part
100: module frame
100': module frame for testing
110: U-frame
120: end frame
122: mounting bracket
130: top plate
200: center jig
210: reinforced plate
220: through hole
230: fastening hole
240: bolt
250: nut
300: guide block jig
400: piston
410: hydraulic cylinder
500: battery cell
600: displacement sensor
610: sensing part
700: control part

The invention claimed is:

1. An acceleration fatigue evaluation device of a welding part of a module frame, comprising:
- a module frame for testing having:
  - a U-frame, the U-frame having an open, unwelded lower surface;
  - a top plate; and
  - a pair of end frames welded to the top plate and opposite sides of the U-frame:
- a center jig connected to the module frame for testing to support a front of the module frame for testing and a rear of the module frame for testing;
- a guide block jig supporting the end frame of the module frame for testing from below;
- a piston configured to enter the module frame for testing, the piston being configured to apply a repeated load to an inner surface of the top plate;
- at least one battery cell interposed between the piston and the inner surface of the top plate; and
- a displacement sensor configured to measure a deformation at a center of an outer surface of the top plate.

2. The acceleration fatigue evaluation device of claim 1, wherein the battery cell is of a same specification as the battery cell mounted in the module frame.

3. The acceleration fatigue evaluation device of claim 2, wherein the battery cell is a pouch cell.

4. The acceleration fatigue evaluation device of claim 3, wherein the pouch cell is in a completely discharged state.

5. The acceleration fatigue evaluation device of claim 1, wherein the guide block jig has downwardly supported edges thereof to avoid encroaching on welding parts of the end frame.

6. The acceleration fatigue evaluation device of claim 1, wherein the repeated load applied by the piston to the top plate via the battery cell is applied in a profile simulating displacement of swelling expansion and contraction of the battery cell as the battery cell progresses through a charge and discharge cycle.

7. The acceleration fatigue evaluation device of claim 6, wherein the profile is a load-cycle profile that converts the displacement of the swelling expansion and contraction of the battery cell over the progression of the charge and discharge cycle into a load.

8. The acceleration fatigue evaluation of claim 7, wherein the load-cycle profile has a pattern wherein a load at charge and a load at discharge increase with the progression of the charge and discharge cycle.

9. The acceleration fatigue evaluation device of claim 8, wherein a difference value between the load at charge and the load at discharge increases with the progression of the charge and discharge cycle.

10. The acceleration fatigue evaluation device of claim 9, further comprising a controller,
- wherein the controller is configured to, in a cycle in which the amount of deformation of the top plate measured by the displacement sensor deviates from a linear increasing pattern and suddenly increases sharply;
- determine that the welding part of the top plate has been destroyed; and
- stop the application of the repeated load.

* * * * *